United States Patent [19]
Wolf

[11] 3,940,278
[45] Feb. 24, 1976

[54] FIBER OPTICS

[75] Inventor: Warren W. Wolf, Reynoldsburg, Ohio

[73] Assignee: Owens-Corning Fiberglas Corporation, Toledo, Ohio

[22] Filed: June 10, 1974

[21] Appl. No.: 477,881

[52] U.S. Cl. .................................. 106/52; 106/50
[51] Int. Cl.² ..................... C03C 3/04; C03C 13/00
[58] Field of Search ................................ 106/52, 50

[56] References Cited
UNITED STATES PATENTS

| | | | |
|---|---|---|---|
| 1,151,911 | 8/1915 | Sullivan et al. .................. | 106/52 |
| 2,212,879 | 8/1940 | Kalsing et al. .................. | 106/52 X |
| 2,664,359 | 12/1953 | Dingledy ...................... | 106/50 |
| 3,258,352 | 6/1966 | Paymal ........................ | 106/52 X |
| 3,801,344 | 4/1974 | Dietz .......................... | 106/52 X |
| 3,811,853 | 5/1974 | Bartholomew et al. ........... | 106/52 X |
| 3,821,004 | 6/1974 | Lagrouw ....................... | 106/52 |

*Primary Examiner*—Winston A. Douglas
*Assistant Examiner*—William G. Wright
*Attorney, Agent, or Firm*—Carl G. Staelin; John W. Overman; Patrick P. Pacella

[57] ABSTRACT

A boron-free glass composition for use in fiber optics is disclosed. In the field of fiber optics, light is transmitted from one point to another by small diameter fibers. These fibers are composed of a central core surrounded by an outer cladding or sheath. The glass compositions of this invention can be used as the core glass or the sheath glass.

1 Claim, No Drawings

FIBER OPTICS

This invention relates to fiber optics. More specifically this invention relates to improved core glass compositions for fiber optics.

In the field of fiber optics, light is transmitted from one point to another by small diameter fibers. These light transmitting fibers are composed of a central core surrounded by an outer cladding or sheath. The fibers or filaments are bundled together to form light pipes. These light pipes are flexible and can be curved around obstacles and placed in remote or hard to install areas.

Light pipes are useful as monitoring and lighting devices in automobiles, aircraft, appliances, computers and medical instruments. They are particularly useful where noncurrent carrying and therefore nonshorting or nonsparking light transmitting devices are required for safety.

Light pipes are used in some late model automobiles. They are run from the automobile headlights and tail-lights to the dashboard. As long as the headlight or taillight is operating, the light pipe transmits light and shows the driver that the lights are on. If one of the lights fails, no light is transmitted by the light pipe connected to that light. And the driver knows that the bulb is burned out.

Light transmitting or optical fibers are usually made of either plastic or glass. Glass fibers are preferred over plastic fibers because of their high heat resistance. The ability of glass to withstand adverse temperature and humidity conditions for long periods of time is also a factor in selecting glass fibers over plastic fibers. While plastic fibers become brittle and discolor at temperatures above about 175°F or show a reduction in light transmission when exposed to long periods of high heat and humidity, glass light pipes are unaffected by high humidity and temperatures in excess of 550°F. Individual optical fibers or filaments used in light pipes are composed of two essential parts, namely a central core and an outer cladding or sheath. The cladding surrounds the core. The index of refraction of the core is higher than the index of refraction of the cladding. Due to this difference between the index of refraction of the core and cladding, the light entering one end of a fiber is internally reflected along the length of the fiber. The principle of "total internal reflection" explains this result. This principle says that a light ray traveling from a material with a higher refractive index (core) to a material with a lower refractive index (cladding) will be reflected at the interface of the two materials.

The amount of light transmitted through a light pipe depends on the intensity of the light source, the cross sectional area of the cores of all the fibers, the losses at each end due to reflection, the absorption properties of the glass and the length of the light pipe.

In making commercially acceptable glass light pipes the chemical composition of the core and cladding is a key factor. In addition to having the proper indices of refraction the core and cladding glasses should have similar viscosities, and liquidus temperatures. These three properties control the ease with which the cladding glass can be laid over the core glass. And when conventional glass fiber forming processes are used to make optical fibers, compatability of the core and cladding is crucial.

Conventional glass fiber forming processes draw fine glass fibers from small holes in the bottom of a reservoir of molten glass. The usual problems of forming fibers the conventional way are multiplied when making optical glass fibers. Two supplies of molten glass are needed; one of the core glass and one of the cladding glass. Then a composite fiber, 80–90% core and 10–20% cladding, is pulled from the glass supplies. To be able to do this at commercial speeds and form commercially acceptable products the composition of the core and cladding glasses must be carefully chosen.

A highly useful optical fiber known in the art is composed of core and cladding glass fibers having the following compositions:

| Cladding Glass | |
| --- | --- |
| Ingredient | Weight Percent |
| $SiO_2$ | 64.1 |
| $Al_2O_3$ | 8.2 |
| $B_2O_3$ | 11.2 |
| $Na_2O$ | 14.0 |
| $LiO_2$ | 2.4 |

| Core Glass | |
| --- | --- |
| Ingredient | Weight Percent |
| $SiO_2$ | 31.9 |
| $Al_2O_3$ | 8.0 |
| $B_2O_3$ | 6.1 |
| $K_2O$ | 6.1 |
| $BaO$ | 47.9 |
| $Sb_2O_3$ | 0.05 |

One problem with both of these glass compositions is that they contain boron. This element is detrimental in many uses of fiber optics because it absorbs gamma radiation. This radiation permanently darkens the boron-containing glasses. As a result, light transmission in the fiber optic product is reduced after exposure to the radiation.

I have now developed boron-free glass compositions which can be used as the core glass in optical fibers. The glass compositions of this invention also can be used as cladding glasses in fiber optics as long as the index of refraction of the core is higher than index of refraction of the cladding.

The boron-free glasses of this invention have the following composition:

| Ingredient | Weight Percent |
| --- | --- |
| $SiO_2$ | 40 to 60 |
| $Al_2O_3$ | 5 to 10 |
| $BaO$ | 0 to 50 |
| $Na_2O$ | 5 to 40 |
| $Sb_2O_3$ | 0 to 0.05 |

Preferred core glass compositions are:

| Ingredient | Weight Percent |
| --- | --- |
| $SiO_2$ | 40 to 50 |
| $Al_2O_3$ | 5 to 7 |
| $BaO$ | 30 to 50 |
| $Na_2O$ | 5 to 20 |
| $Sb_2O_3$ | 0 to 0.05 |

These glass compositions have an index of refraction ranging from 1.50 to 1.65. The preferred core glass compositions have an index of refraction ranging from 1.55 to 1.65.

Two different glass compositions of this invention can be used together to form a fiber optic product. Or the glass compositions can be used as a core glass with cladding glasses falling outside the scope of this invention. Or these glass compositions can be used as a cladding glass with core glasses falling outside the scope of this invention. All of these combinations are operable as long as the index of refraction of the core is higher than the index of refraction of the cladding. Naturally, the differences in the indexes and fiber forming properties of the glass compositions also have to be considered.

Specific glass compositions embodying the principles of this invention are set forth in Examples 1 through 6.

| Ingredients | | Weight Percent | | | | | |
|---|---|---|---|---|---|---|---|
| | Example | 1 | 2 | 3 | 4 | 5 | 6 |
| $SiO_2$ | | 42.1 | 44.5 | 47.1 | 50.1 | 53.5 | 57.4 |
| $Al_2O_3$ | | 6.0 | 6.3 | 6.7 | 7.1 | 7.6 | 8.1 |
| BaO | | 44.6 | 37.8 | 30.0 | 21.3 | 11.4 | — |
| $Na_2O$ | | 7.3 | 11.5 | 16.2 | 21.5 | 27.6 | 34.5 |
| $Sb_2O_3$ | | 0.05 | 0.05 | 0.05 | 0.05 | 0.05 | 0.05 |
| Liquidus Temperature, °F | | 2062 | 1909 | 1643 | 1427 | 1437 | 1535 |
| Viscosity, Temperature, °F | | | | | | | |
| Log Poise | 2.00 | 2350 | 2405 | 2334 | 2332 | 2343 | 2380 |
| | 2.25 | 2235 | 2272 | 2218 | 2208 | 2212 | 2245 |
| | 2.50 | 2137 | 2153 | 2122 | 2089 | 2097 | 2130 |
| | 2.75 | 2053 | 2053 | 2040 | 1978 | 2000 | 2025 |
| | 3.00 | 1973 | 1953 | 1965 | | 1915 | 1933 |
| Refractive Index | | 1.59 | 1.57 | 1.56 | 1.54 | 1.53 | 1.51 |

These boron-free glass compositions are not as sensitive to radiation damage as the boron-containing glass compositions of the prior art. Light transmitted by the boron-free glass compositions was a more true white: the amount of yellow here in the transmitted light was reduced.

The glass compositions of this invention can be used as core glass with the following cladding glass composition.

EXAMPLE 7 (Cladding)

| Ingredients | Weight Percent |
|---|---|
| $SiO_2$ | 64.1 |
| $Al_2O_3$ | 8.2 |
| $B_2O_3$ | 11.2 |
| $Na_2O$ | 14.0 |
| $Li_2O$ | 2.4 |

Liquidus: No devitrification at 1455° to 1850°F over a period of 64 hours.

| Log Viscosity | Temp., °F |
|---|---|
| 2.0 | 2470 |
| 2.5 | 2180 |
| 3.0 | 1970 |

Refractive Index 1.50

Light transmitting optical fiber products were actually made from the following combinations of core and cladding glass compositions:

| Core | Cladding |
|---|---|
| Example 1 | Example 7 |
| Example 1 | Example 2 |
| Example 2 | Example 7 |
| Example 2 | Example 4 |

I have described this invention in considerable detail and do not wish to be limited to the particular embodiments shown. Modifications and variations within the scope of the appended claims are inteded to be included.

I claim:

1. A boron-free glass composition capable of being the core glass or cladding glass in a light transmitting optical fiber product; said glass composition consisting essentially by weight of:

| Ingredient | Weight Percent |
|---|---|
| $SiO_2$ | 40 to 50 |
| $Al_2O_3$ | 5 to 7 |
| BaO | 30 to 50 |
| $Na_2O$ | 5 to 20 |
| $Sb_2O_3$ | 0 to 0.05 | and having an index of refraction ranging from 1.55 to 1.65.

* * * * *